(12) United States Patent
Amir et al.

(10) Patent No.: US 9,313,367 B2
(45) Date of Patent: Apr. 12, 2016

(54) IMAGE COMPRESSION

(75) Inventors: Gidi Amir, Ness Ziona (IL); Doron Shaked, Tivon (IL); Ruth Bergman, Haifa (IL); Gitit Ruckenstein, Haifa (IL); Leonid Vygodner, Rishon le Zion (IL); Alexander Spivakovsky, Beit-Shemesh (IL); Andrey Iossifov, Netanya (IL); Yaron Ruckenstein, legal representative, Haifa (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 1597 days.

(21) Appl. No.: 12/598,033

(22) PCT Filed: Apr. 30, 2007

(86) PCT No.: PCT/US2007/010432
§ 371 (c)(1),
(2), (4) Date: Oct. 28, 2009

(87) PCT Pub. No.: WO2008/133632
PCT Pub. Date: Nov. 6, 2008

(65) Prior Publication Data
US 2010/0128286 A1    May 27, 2010

(51) Int. Cl.
*G06K 15/02* (2006.01)
*H04N 1/41* (2006.01)

(52) U.S. Cl.
CPC .................... *H04N 1/41* (2013.01)

(58) Field of Classification Search
CPC ........................................ H04N 1/41
USPC ................................. 382/100–180
See application file for complete search history.

(56) References Cited

U.S. PATENT DOCUMENTS

| | | | |
|---|---|---|---|
| 5,664,406 A | 9/1997 | Smith | |
| 6,091,511 A | 7/2000 | Ben Dror | |
| 7,145,696 B2 | 12/2006 | Silverbrook | |
| 2006/0104528 A1* | 5/2006 | Tamura et al. | 382/239 |
| 2006/0181720 A1 | 8/2006 | Kakutani | |
| 2007/0058875 A1* | 3/2007 | Tabata et al. | 382/239 |
| 2007/0258641 A1* | 11/2007 | Srinivasan et al. | 382/166 |

OTHER PUBLICATIONS

International search report and written opinion in parent PCT patent application, PCT/US2007/010432, dated Jan. 17, 2008.

* cited by examiner

*Primary Examiner* — Marcellus Augustin

(57) ABSTRACT

A method for compressing a digital image to be printed, the image consisting of pixels. It is determined, for blocks of pixels, whether a block contains a graphical structure that is to be maintained without loss because it is of a type that can be accurately perceived by a human observer. The block is encoded losslessly into a less voluminous format, if such a graphical structure has been found. Otherwise, the block is compressed lossily, if no such graphical structure has been found.

23 Claims, 10 Drawing Sheets

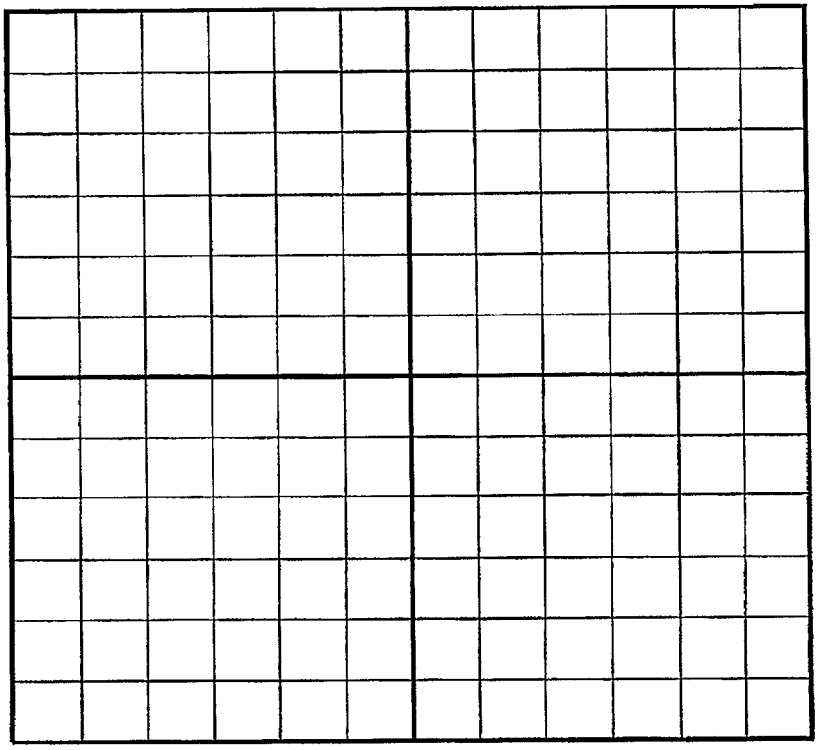
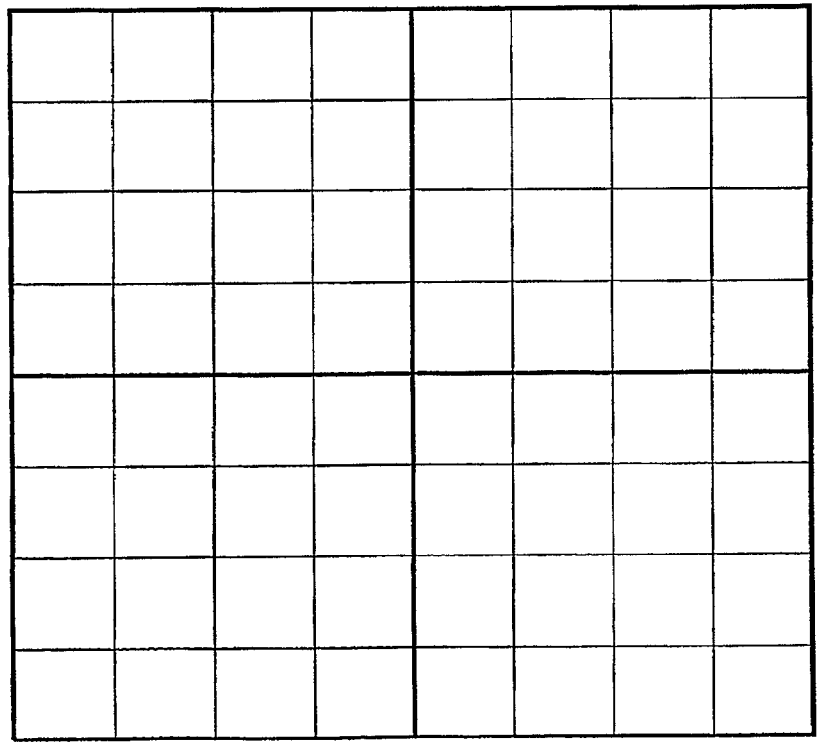

*Fig. 7*
1200 DPI
3x3 PIXELS
800 DPI
2x2 PIXELS
 
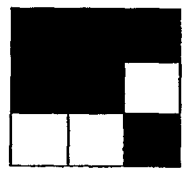 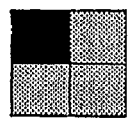
 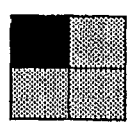
 
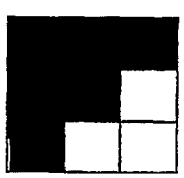 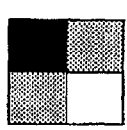
 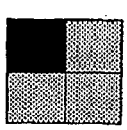
 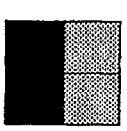
 

IMAGE COMPRESSION

FIELD OF THE INVENTION

The present invention relates generally to image processing of images to be printed, and more particularly, to a method, a computer system and a computer program product for compressing an image to be printed.

BACKGROUND OF THE INVENTION

In the area of commercial and industrial printing (e.g. printing of promotion material, product packages or newspapers), offset printing is the prevalent printing technique. Conventional offset printing machines have to compete increasingly with new electrophotographic printing systems which are capable of producing commercial and industrial printing products with similar high quality. These electrophotographic printing systems use liquid toner or liquid inks in order to attain a high spatial resolution.

It has been proposed to compress images to be printed in order to decrease bandwidth load while transmitting images from a workstation (where an image might have been created or processed) to a printing system and to economize memory and computing power of printing systems. U.S. Pat. No. 7,145,696 B2 to Silverbrook describes how printing data can be compressed by using different compression methods for contone layers and two-color layers. U.S. Pat. No. 2006/0181720 to Kakutani proposes differentiation between edges, which are not to be compressed, and other areas within an image, which are to be compressed. Another approach is disclosed in U.S. Pat. No. 5,664,406, where image blocks of 4×4 pixels are encoded using 32 bits. Depending on the identified color contrast within a block, an adequate compression algorithm for this block is chosen. If, for example, the block contains only one uniform color, all 32 bits can be used for color representation, whereas if a block contains a larger quantity of colors, a major part of the 32 bits is used for representation of spatial resolution and therefore only few bits are left for color representation. The result is an image that is subdivided into several pieces and encoded with various encoding techniques. A comparable approach is shown in U.S. Pat. No. 6,091,511 to Ben Dror et al., wherein the gray-level contrast within a block of pixels is determined and either a high spatial resolution with a narrow gray-level range or a low spatial resolution with a wide gray-level range is selected.

SUMMARY OF THE INVENTION

A first aspect of the invention is directed to a method for compressing an image to be printed. This method comprises a determination, for blocks of pixels, whether a block contains a graphical structure that is to be maintained without loss because it is of a type that can be accurately perceived by a human observer; encoding the block losslessly into a less voluminous format, if such a graphical structure has been found; compressing the block lossily, if no such graphical structure has been found.

According to another aspect, a workstation computer is provided which is arranged to compress an image to be printed. This compression method comprises a determination, for blocks of pixels, whether a block contains a graphical structure that is to be maintained without loss because it is of a type that can be accurately perceived by a human observer; encoding the block losslessly into a less voluminous format, if such a graphical structure has been found; compressing the block lossily, if no such graphical structure has been found.

According to another aspect, a printing system is provided which is arranged to print an image that the printing system receives in a compressed representation. The printing system comprises a processor programmed to decode the compressed representation, whereby the compressed representation is characterized by blocks, each having a multiplicity of pixels. A block containing a graphical structure of a type that can be accurately perceived by a human observer is encoded losslessly in a less voluminous format than that of a bitmap representation of the pixels of the block, whereas a block not containing such graphical structures has been compressed lossily.

According to another aspect, a computer program product is provided which is in the form of a machine-readable medium with program code stored on it, wherein the program code is arranged to carry out a method for compressing an image to be printed. The method comprises a determination, for blocks of pixels, whether a block contains a graphical structure which can be accurately observed by a human eye and therefore is to be maintained without loss; encoding the block losslessly into a less voluminous format, if such a graphical structure has been found; compressing the block lossily, if no graphical structure which is to be maintained without loss has been found.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 2 a-b schematically show equal images, both being subdivided in blocks, but having a different spatial resolution;

FIG. 7 gives examples of conversion of an image block from 1200 dpi to 800 dpi for miscellaneous high contrast structures;

The drawings and the description of the drawings are of embodiments of the invention and not of the invention itself.

DESCRIPTION OF THE PREFERRED EMBODIMENTS

Figure 1:
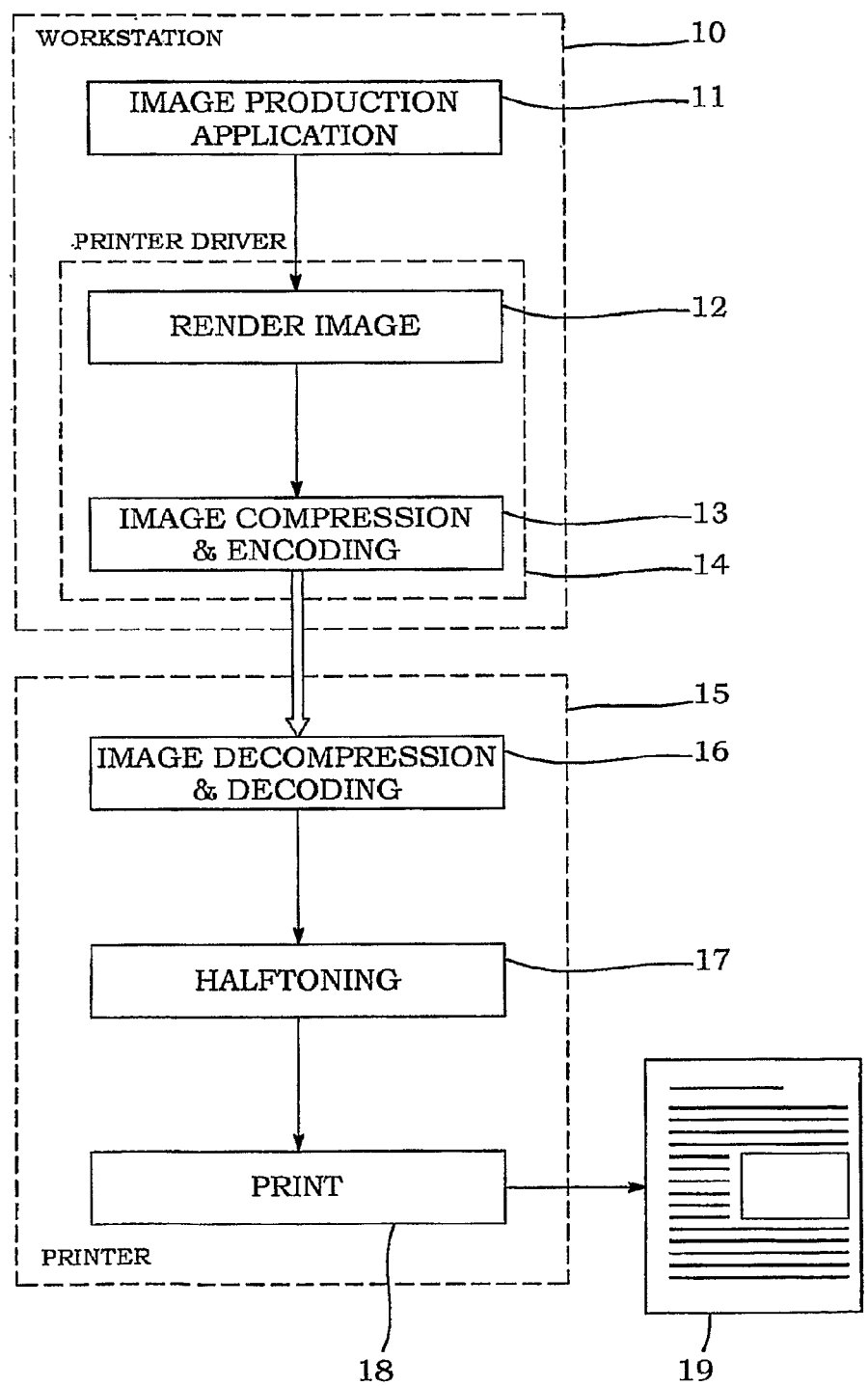
FIG. 1 is a high-level flow chart showing the conceptual data flow of an image processing and printing process.

FIG. 1 is a high-level flow chart showing the conceptual data flow of a printing process, starting with an image production application (i.e. a computer program) on a designer's workstation and resulting in a printed page produced by a printing device. Before proceeding further with the detailed description of FIG. 1, however, a few items of the embodiments will be discussed.

The quality of printed digital images depends on spatial and color resolution, which are given by the according digital image data representation, and the capabilities of the printing device used. As mentioned above, commercial and industrial electrophotographic printing machines are able to produce digital print-outs with a high quality such as a spatial resolution of 1200 dpi. Therefore, digital image representations of images to be printed using these printing machines support an equally high spatial resolution. However, definition of digital images possessing a high spatial resolution requires a significant amount of data. For example, a bitmap representation of a DIN A 4 page (210 mm×297 mm or 8.27"×11.7") at a spatial resolution of 1200 dpi and an encoding format of 8 bits per pixel (which allows for the representation of 256 colors or gray levels at most) requires approximately 137 Megabytes of memory space. This value further increases with higher image size or higher color resolution. Such high data traffic leads to high loads on memory, bandwidth and computing power.

In the embodiments, images are compressed according to the graphical structure of each image block, as will be explained below in more detail. The embodiments analyze the graphical structure within image sections called blocks. These blocks are independent from the actual content of an image, i.e. they are not the result of a segmentation process dividing the image, for example, into a text and a graphics part. In some embodiments, an image may be subdivided into blocks of uniform physical size. In some embodiments, said blocks may be rectangles, while in other embodiments blocks may be squares.

In the embodiments, depending on the determination of a graphical structure within an image block, a certain compression method is chosen in order to reduce the data necessary to define the digital image. The reason for choosing different compression methods for blocks containing different types of graphical structures is the characteristic of the human optical perception to notice some graphical structures more accurately than others. It has been determined that especially thin, straight and low-slope lines having a high color contrast are such types of graphical structures. In the case of low-slope lines, in particular, the staircase caused by the pixels of a digital image can be perceived very well. In gray-scale images, such high contrast structures are, for example, black lines on white background or white lines on black background. Images covering the full color spectrum, such as CMYK images, can be separated into color separations, which can be again represented by gray-scale colors only. For example, the cyan separation of a CMYK image contains only gray-scale colors, whereby pure black represents the maximum cyan level and pure white represents the minimum cyan level. The embodiments therefore focus on the compression of gray-level images which also includes the color level representation of CMYK separations and other color models.

In the embodiments, image blocks are tested for their graphical structure. If a block is composed of black and white, and contains at least one horizontal or at least one vertical straight line, then this block is compressed losslessly. Losslessly compressed images can be completely restored to the original, uncompressed format, as the compression methods used only eliminate redundant information of the original image format and re-arrange the remaining information (so-called encoding) into a less voluminous form. This is in contrast to a corresponding bitmap representation, which would require one bit for each pixel for a block containing two colors (in this case black and white), a block composed of either horizontal or vertical straight lines can be described by just stating which row or column is made of black and which column is made of white. If a block is, for example, a square of 6×6 pixels, a bitmap representation would require 36 bits, whereas a row/column representation would require only 6 bits (plus 1 bit to indicate, whether there are horizontal or vertical lines). According to this, the embodiments preserve said blocks with the original spatial resolution, so that the printing device is enabled to print this block according to its highest technical capabilities and there is no qualitative difference for the human observer of the printed image.

In some embodiments, transparent pixels within blocks are considered as well. Transparent areas can become any color at a later stage in the image and printing process, among them also black and white color. The consideration of transparency also enables the use of the embodiments for support of graphical arts applications. Some embodiments determine whether a block contains horizontal or vertical straight lines composed of black and white, or black and transparent, or white and transparent areas. For each of these cases, a lossless compression method as described above, is applied to a block.

Some of the embodiments further test a block for low-slope lines composed of black and white, or black and transparent, or white and transparent areas. These lines are also among the most distinguishable types of graphical structures and should therefore be preserved with maximum quality. As a block may contain both, straight and low-slope lines, a check is made whether a block is composed of one or two horizontal patterns of pixels and optional horizontal straight lines, or one or two vertical patterns and optional vertical straight lines. Thereby, all blocks containing either one step of a low-slope staircase, or an end of a line running over a multiplicity of blocks are covered. Such blocks are also losslessly compressed. Again, the existence of regular attributes, such as the two patterns per row or column and additional straight lines, implies that a bitmap representation of said blocks incorporate redundancy, which can be eliminated by rearranging the block information. A specific example of an embodiment implementing such an encoding method eliminating redundancy will be given below.

As explained above, straight and low-slope lines having a high color contrast are the most distinguishable types of graphical structures for a human observer. More complex structures having an equally high color contrast, such as scattered black pixels on white background, can be noticed with less quality by the human optical perception system. Thus, in some embodiments, image blocks having a high color contrast, but a more complex graphical structure, are compressed lossily to a lower spatial resolution and therefore smaller data size. Some embodiments introduce gray levels into said blocks in order to countervail the loss of spatial resolution. Some embodiments do not introduce gray levels into said blocks. Pixels of blocks which have been converted to a lower spatial resolution can be represented either by a single bit, if it still is a two-color block (including transparent areas), or by multiple bits, if the block contains more than two colors. Blocks at a lower spatial, but higher color resolution can also be encoded into a less voluminous format than an according bitmap representation, for example by using conversion tables. A conversion table can contain all permutations of color-to-pixel assignments that are used for the conversion. To achieve compression by the usage of a conversion table, the number of bits for representing the used permutations should be smaller than the number of bits required for a bitmap representation of the block or sub-block. Since the graphical structures described, are not easily perceived, the loss of data defining the image block has no practical impact on the visible quality of the printed image. Nevertheless, some embodiments maintain said graphical structures losslessly at the original spatial resolution.

If a block contains graphical structures, such as straight or low-slope lines, but is not composed of pure black and white, but gray levels very close to pure black or pure white, e.g. the highest gray level directly following black or the lowest gray level directly following white, some embodiments do not compress this block using the described lossless compression methods. Rather, such a block may be compressed lossily to a lower spatial resolution. Other embodiments may use an upstream image processing, which converts such close-to-black and close-to-white colors to pure black and white and then compress such a block losslessly as described above. In the strict sense, this approach is not entirely lossless, as color information of the close-to-black or close-to-white block is converted and consequently lost. This approach is only lossless in the context of the image compression, after a color conversion to pure black and pure white has been conducted.

In the context, of the embodiments, another type of graphical structure is represented by a block, which is not composed of pure black and white (or pure black and transparent, or pure white and transparent), thus gray levels, and the color level contrast within this block exceeds a preselected threshold or if the block is composed of all three, black, white and transparent areas. Some embodiments compress such a block lossily to a lower spatial resolution. Such a block either has a color contrast or a type of graphical structure which allows the block to be printed at a lower spatial resolution without losing visible quality to the human observer of the printed image. For this type of block, possibly containing various gray levels, a plurality of graphical layouts is thinkable. Therefore, some embodiments allow the representation of a wide gray scale (e.g. 256 gray levels) for the converted block as well. In this case, the usage of conversion tables is not appropriate, since there are too many combinations of gray-level pixels in the converted block. But rather, some embodiments interpolate several pixels at the higher spatial resolution level and map these values to designated pixels at the lower spatial resolution level.

A different of graphical structure is built by blocks which contain at least one intermediate gray level and wherein the gray-level contrast within the blocks does not exceed a preselected threshold. Some embodiments compress such a block lossily to a lower spatial resolution. In contrast to the aforementioned types of blocks, these blocks are of low color contrast only and are therefore weakly distinguishable by a human observer. To ensure sufficient printing quality, so that a human observer does not see a difference between the printed block and a low contrast block at a higher spatial resolution, and simultaneously guarantee low data volume, these blocks are converted by assigning one single color level to the entire block. Blocks containing one single color value can be encoded with very few bits only depending on the number of possible color levels.

Some embodiments include a workstation, which is arranged, to perform the image compression according to the method described above. The workstation may be a computer whereby a graphical designer produces digital images which are to be printed by a printing system. After an image has been finalized, the workstation compresses the digital image according to the method described above, and the compressed image representation can be transmitted to the respective printing system. The transmission can be conducted, for example, via a computer network like a local area network (LAN) or the internet.

The printing system of some embodiments can be composed of a printing machine and a control computer. Between both said components, there should exist a high bandwidth connection in order to enable fast transmission of the image data. The printing system is arranged to receive an image to be printed in a compressed representation according to the method described above. It also includes a processor programmed to decode said compressed image representation. In some embodiments, the processor resides within the control computer, while in other embodiments the processor resides directly within the printing machine. The printing machine may, for example, be a high quality electrophotographic printer.

Some embodiments of the computer program product include a machine-readable medium, on which the program code to perform the image compression described above is stored and wherefrom it can be executed on a computer. The said machine-readable medium is not limited to removable media as, for example, CD, DVD or USB drives, but can also be in the form of hard disks, central memory (i.e. RAM), read-only memory (i.e. ROM) and other memory types.

Returning now to FIG. 1, which consists of a high-level flow chart showing the conceptual data flow of a digital printing process, from an image production application 11 on a workstation computer 10 to a printed page 19. When an image is to be printed, it is handed over from the image production application 11 (i.e. a computer program) on the workstation computer to a printer driver 14. The printer driver 14 processes the image so that it can be sent to the printing device 15. This process may include rendering 12 the image to a preferred format suitable for printing (e.g. from RGB color model to CMYK color model), compressing and encoding 13 the image, transmitting the image to the printing device, decompressing 16 and halftoning 17 the image and, finally, printing 18 the image onto the preferred substrate. As can be recognized in this process, image compression and encoding 13 should permit a fast and bandwidth-saving transmission to the printing device. Additionally, it is necessary that the image can be decompressed 16 and decoded with low computing power. After decompression 16 the image should be available with adequate quality to facilitate the best possible print-out product 19 depending on the purpose of the print.

Before it is compressed and sent to a printing device, an image should be rendered 12 to a suitable form. For some embodiments, an image can be theoretically provided having any spatial resolution. It is of course desirable that the image in its original digital format is available with an equal or higher spatial resolution than the printing device 52 is capable of processing. In some embodiments, the spatial resolution of the printing device 52 resides at 1200 dpi. If the original image is defined at a spatial resolution of 1600 dpi, it should be converted at 12 to 1200 dpi in order to be processed by the embodiments.

FIGS. 2a and 2b show two digital images of equal size, both subdivided into blocks of uniform physical size, but having a different spatial resolution. Prior to compressing and encoding according to the embodiments, an image should be subdivided into blocks. In some embodiments, an image is subdivided into blocks of uniform physical size. In other embodiments, said blocks are squares having a side length of 125 µm. Depending on the overall spatial resolution of the image, a said block having a side length of 125 µm contains a different number of pixels. FIG. 2a schematically shows an image at a spatial resolution of 800 dpi. At 800 dpi, each block of 125 μm side length contains 4×4 pixels. In contrast, FIG. 2b represents an image at a spatial resolution of 1200 dpi, where a block of 125 μm side length is composed of 6×6 pixels. If both images are encoded by a bitmap representation, where each pixel is represented by a uniform number of bits, the definition of a 1200 dpi image in FIG. 2b would require an amount of data 2, 25-fold as great as the definition of an 800 dpi image in FIG. 2a.

Figure 3:
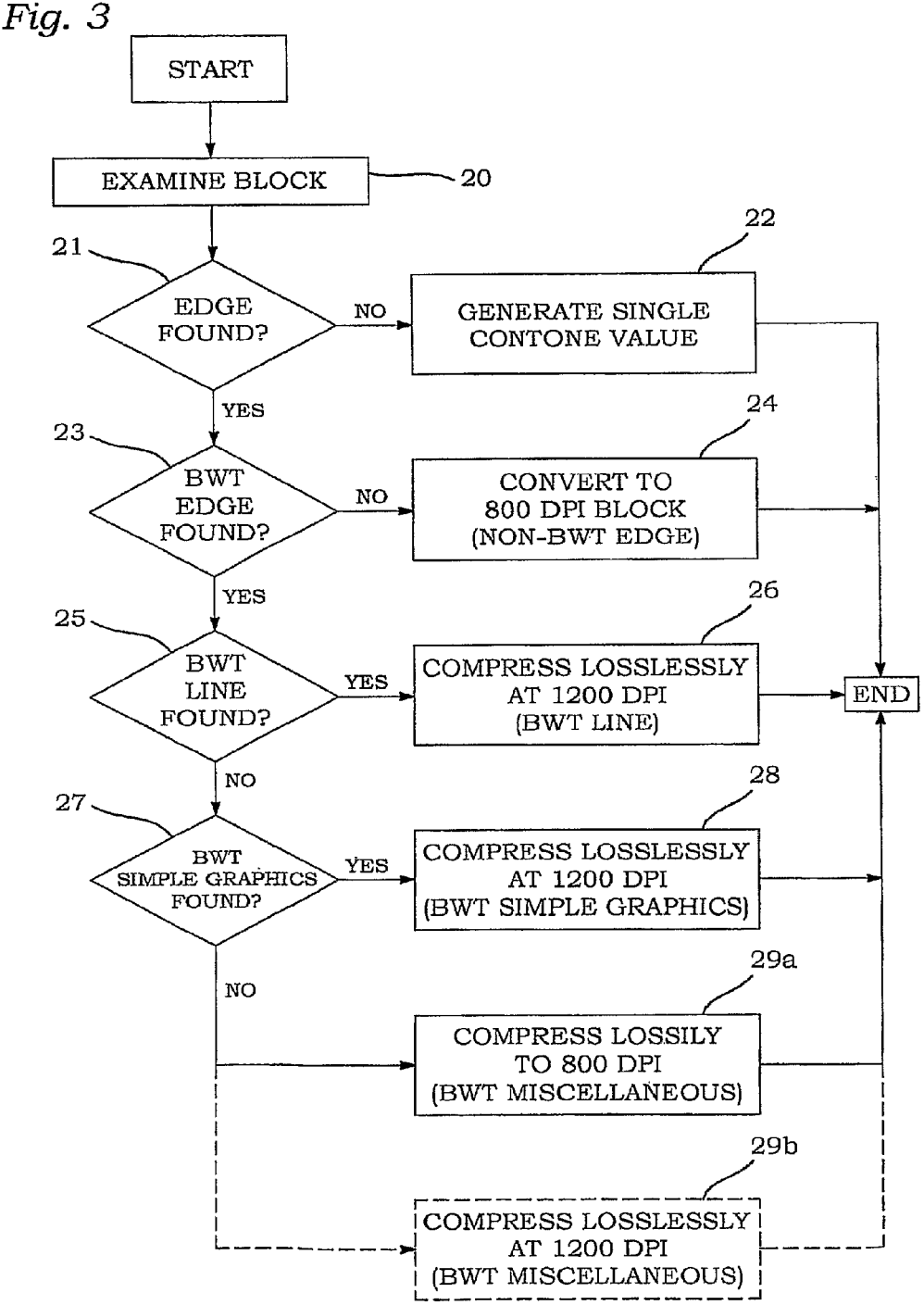
FIG. 3 shows a flow chart of image compression using determination of graphical structures within a block according to an embodiment.

FIG. 3 shows a flow chart of image compression using determination of graphical structures within a block according to some embodiments. At the beginning, a block has to be examined 20 if it contains a graphical structure a human eye may be able to perceive more accurately than other graphical structures. In the context of the embodiments, these graphical structures are called edges. In some embodiments, the examination includes the determination of the gray-level contrast within a block. Accordingly, a block contains an edge, if the gray-level contrast exceeds a preselected threshold. In accordance with other embodiments, the determination of the gray-level contrast includes determining the difference between the gray level of the highest gray-level pixel (e.g. pure black) and the gray level of the lowest gray-level pixel within a block. Alternatively, in another embodiment, determining the gray-level contrast includes determining the ratio between the gray level of the highest gray-level pixel and the gray level of the lowest gray-level pixel.

Figure 4B:
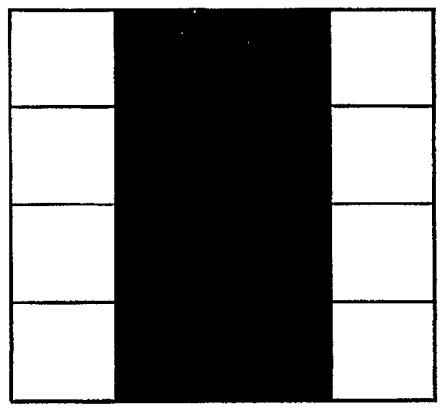
FIG. 4 a-f illustrate example image blocks containing high contrast horizontal and vertical straight lines.
Figure 4C:
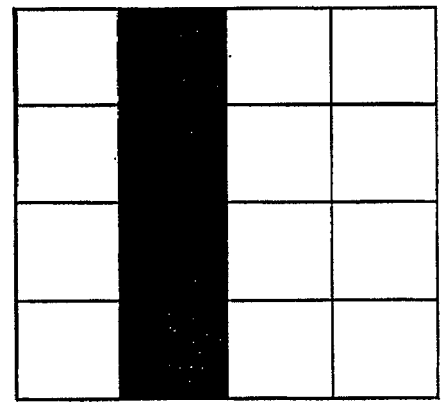
Figure 4A:
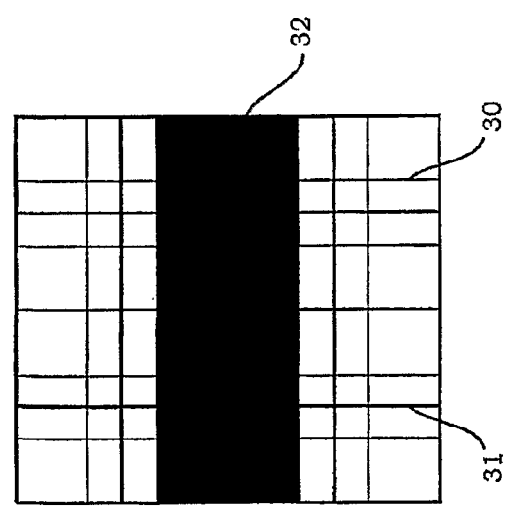
Figure 4E:
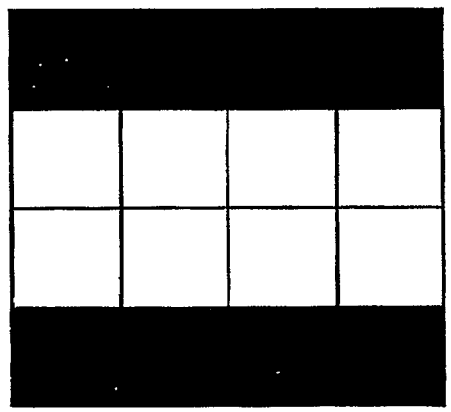
Figure 4F:
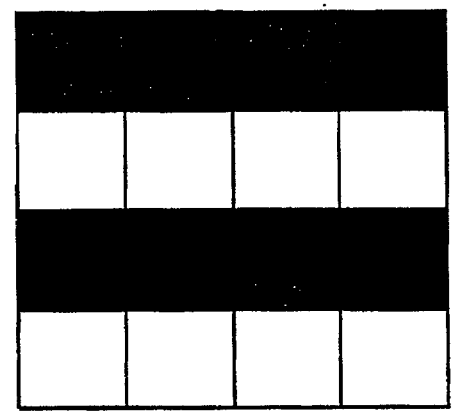
Figure 4D:
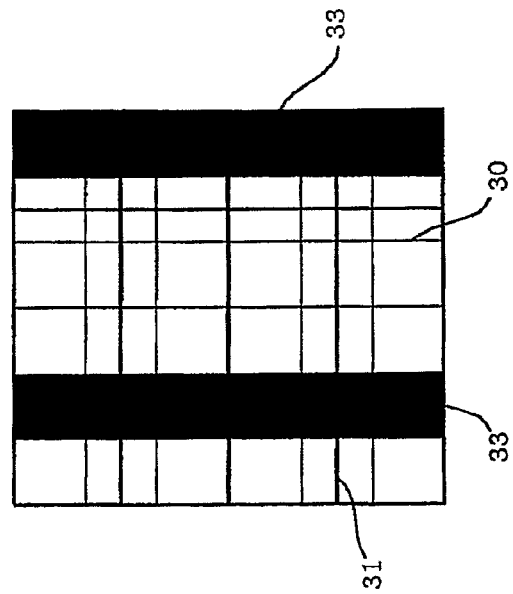

In the following, the different types of graphical structures in the context of the embodiments and their respective compression methods are described on the basis of FIG. 3. The first type of graphical structure, which is to be maintained without loss because it is of a type that can be very accurately perceived by a human observer, are edges composed of black and white, or black and transparent, or white and transparent areas, and which are additionally built of one or more straight horizontal or one or more vertical lines within the block. In the context of the embodiments, these straight lines, composed of black and white, or black and transparent, or white and transparent areas, are called BWT lines (Black, White, Transparent). BWT lines are detected at 25, after an edge has been found at 21, and this edge has been determined as a BWT edge at 23, meaning the block contains either black and white, or black and transparent, or white and transparent areas. Examples of horizontal and vertical BWT lines are shown in FIGS. 4a and 4d. In both figures, the thin block lines 30 represent the high spatial resolution of the block before compression. The thicker lines 31 represent a hypothetical lower spatial resolution of the block. It can be recognized that at a hypothetical lower spatial resolution, the black horizontal line 32 in FIG. 4a would either have to be wider (double size as depicted in FIG. 4b) or it would have to be at a different place, e.g. a bit higher as shown in FIG. 4c. The same is true for the vertical lines 33 of FIG. 4d. Possible results of a hypothetical compression to a lower spatial resolution level are depicted in FIGS. 4e and 4f. At a high color contrast level, as with black and white, these differences between a high and a lower spatial resolution can be observed by the human eye and result in a decrease of viewable quality of the printed image. Therefore, if a BWT line has been detected at 25, the block is compressed losslessly at 26 using BWT line compression, i.e. encoding the block at the same spatial resolution level. In some embodiments, wherein the image before compressing and encoding has been rendered to a spatial resolution of 1200 dpi, the block is encoded at an equal spatial resolution level of 1200 dpi. A bitmap representation of a 1200 dpi block, which may be composed of 36 pixels, and where two bits per pixel are needed in order to represent the three possible pixel states (black, white, transparent), would require 72 bits. In contrast to such a bitmap representation, some embodiments require only 9 bits per 6×6 1200 dpi block for the representation of BWT lines. This representation exploits the fact that BWT lines feature a simple layout. 2 bits are needed to define whether the block contains black and white, black and transparent, or white and transparent areas. Another bit is required to indicate if the lines are horizontal or vertical. The remaining 6 bits indicate the layout of the six rows or columns in the block, where, for example, a "1" may represent a black row or column, and a "0" may represent a white row or column. A possible representation of such an encoding of the examples in FIGS. 4a and 4b is shown in Table 1.

TABLE 1

|  | B-T, W-T | Horizontal or vertical line | 6-bit vector |
|---|---|---|---|
| Caption | 11 = Black & White<br>10 = Black & Transparent<br>01 = Transparent & White<br>00 = illegal code | 0 = Horizontal<br>1 = Vertical | 0 = White<br>1 = Black |
| Example FIG. 4a | 11 | 0 | 001100 |
| Example FIG. 4d | 11 | 1 | 010001 |

Figure 5B:
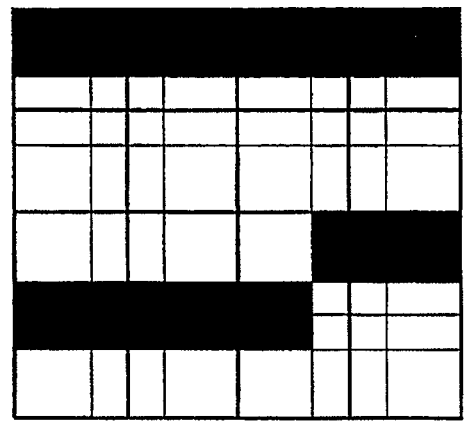
FIG. 5 a-b exemplify image blocks containing high contrast low-slope lines.
Figure 5A:
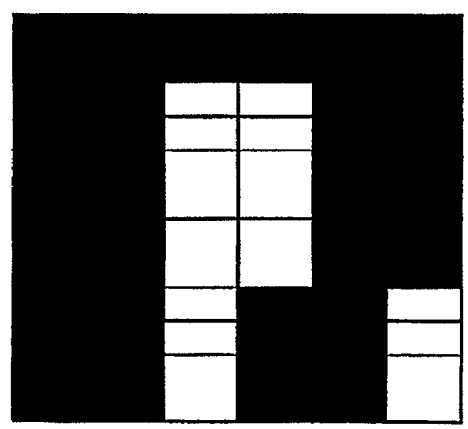

The second type of graphical structure, which is also to be maintained without loss because it is of a type that can be accurately perceived by a human observer, are BWT edges (i.e. blocks composed of black and white, or black and transparent, or white and transparent areas) composed of one or two different horizontal or vertical patterns. In some embodiments, said patterns can exist additionally to BWT lines in the block. These blocks may be, for example, part of a long and high contrast low-slope line in the image. Patterns of said type are called BWT simple graphics in the context of the embodiments. BWT simple graphics are detected at 27, after an edge has been found at 21, this edge has been determined as a BWT edge at 23, and no BWT line could be discovered at 25. Examples of BWT simple graphics are depicted in FIGS. 5a and 5b. If a BWT simple graphic has been detected, the block is compressed losslessly at 28 using BWT simple graphics compression. In some embodiments, wherein the image before compressing and encoding has been rendered to a spatial resolution of 1200 dpi, the block is encoded at an equal spatial resolution level of 1200 dpi. A bitmap representation would require 2 bits per pixel, covering all three combinations of black, white and transparent pixels, ending up with 72 bits for a 6×6 pixel 1200 dpi block. By contrast, the representation of a block containing a BWT simple graphic requires 27 bits per 6×6 1200 dpi block. Again, there are 2 bits needed to define, whether the block contains black and white, black and transparent, or white and transparent areas. Another bit is required to indicate, if the BWT simple graphics are horizontal or vertical. Furthermore, to define the two vertical or horizontal patterns occurring in the block, there are 6 bits per pattern required. Finally, 6×2 bits are needed for the actual indication, which line or row in the block contains which pattern. In some embodiments, "01" represents the first pattern, "10" represents the second pattern, "00" stands for a pure white row or column and "11" stands for a pure black row or column. A possible representation of the examples in FIGS. 5a and 5b according to an embodiment is shown in Table 2.

TABLE 2

| | B-T, W-T | Horizontal or vertical | Pattern 1 | Pattern 2 | 6 × 2-bit vector |
|---|---|---|---|---|---|
| Caption | 11 = B & W<br>10 = B & T<br>01 = T & W<br>00 = illegal code | 0 = Horizontal<br>1 = Vertical | 0 = W<br>1 = B | 0 = W<br>1 = B | 00 = WWWWWW<br>01 = pattern 1<br>10 = pattern 2<br>11 = BBBBBB |
| Example FIG. 5a | 11 | 0 | 011011 | 110011 | 01 01 10 10 10 11 |
| Example FIG. 5b | 11 | 1 | 001001 | 010001 | 01 01 10 10 10 10 |

Figure 6:
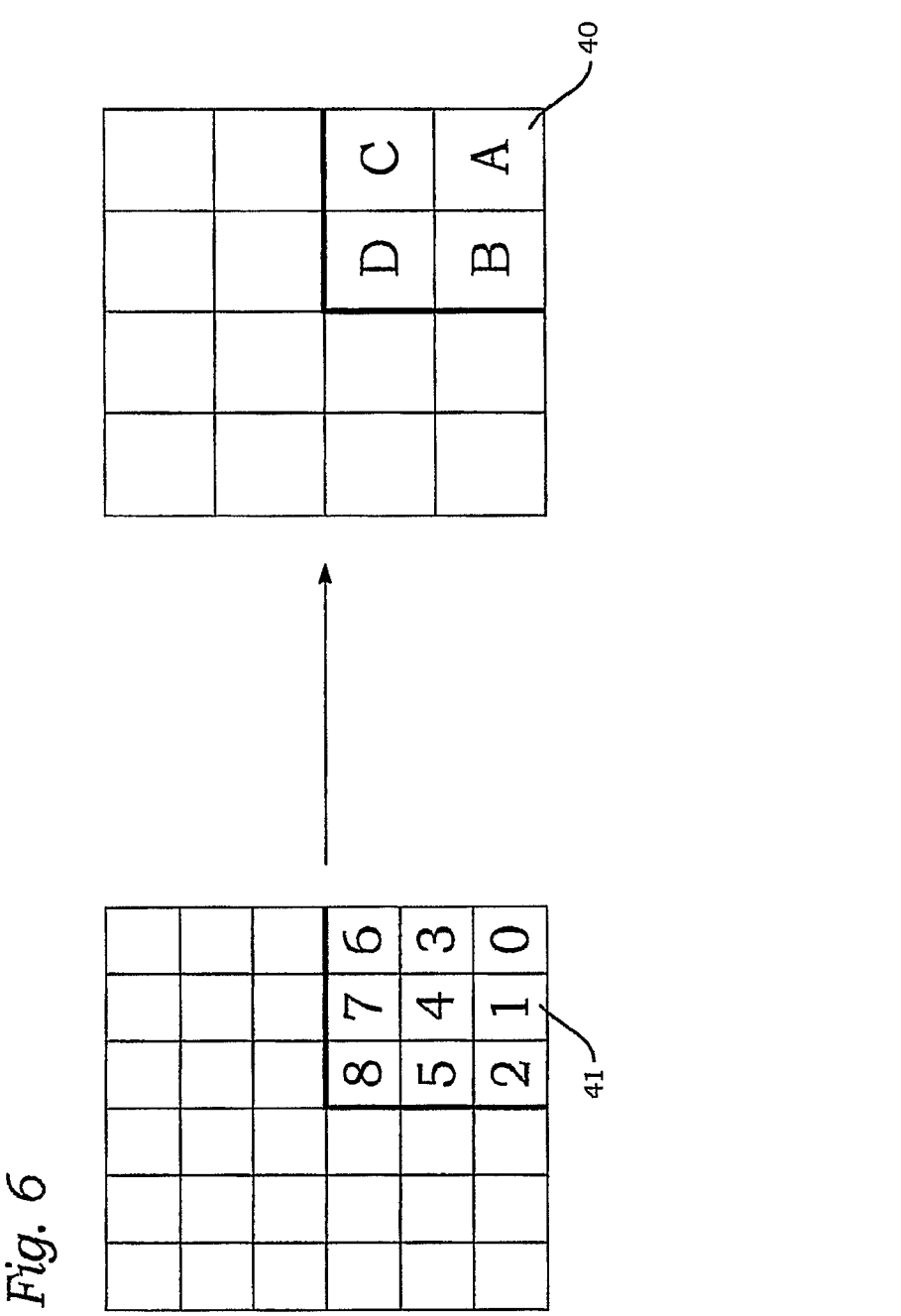
FIG. 6 schematically illustrates mapping between a 1200 dpi block and an 800 dpi block for miscellaneous high contrast structures.

All other types of graphical structures are compressed lossily using different lossy compression methods. The first type of graphical structures which are to be compressed to a lower spatial resolution are BWT edges that neither contain BWT lines nor BWT simple graphics. In that case, the block indeed contains a BWT edge, but these structures are either hard to reproduce by printing devices or, alternatively, not very accurately observable by the human eye. In the context of the embodiments, these structures are called BWT miscellaneous. BWT miscellaneous structures are detected at 27. Preconditions are that an edge has been found at 21, this edge has been determined as a BWT edge at 23, no BWT line could be discovered at 25 and no BWT simple graphics could be found at 27 either. In some embodiments, a block containing a BWT miscellaneous is compressed lossily at 29a to a lower spatial resolution, simultaneously introducing intermediate gray levels. In some embodiments, one additional gray level is introduced. In some embodiments, wherein the image before compressing and encoding has been rendered to a spatial resolution of 1200 dpi, the block is converted to a spatial resolution of 800 dpi. FIG. 6 shows a method for such a conversion. A quarter of a 1200 dpi block 41, which consists of 3×3 pixels, is mapped to a quarter of an 800 dpi block 40, which consists of 2×2 pixels, each pixel encoded by a single bit or multiple bits. In another embodiment, wherein the image before compressing and encoding resides at a spatial resolution of 1200 dpi, the block is converted to a spatial resolution of 600 dpi. In one embodiment, mapping a block from 1200 dpi to 800 dpi is conducted by using a predefined conversion table. Said conversion table may include all used color combinations for a quarter of an 800 dpi block 40. If one additional gray level is introduced, there are three alternatives for allocating an 800 dpi pixel (black, white and gray, where black or white could also be transparent), which results in 81 permutations ($3^4$) for a 2×2 pixel block quarter 40 allocation. In one embodiment, 24 of these combinations are not used, thus it is possible to represent the remaining 57 combinations with 6 bits. In this embodiment, an encoding format could be made of 26 bits for representation of a mapped 800 dpi block. Again, there are 2 bits needed to define whether the 1200 dpi block contains black and white, black and transparent or white and transparent areas. Thereafter, for each of the four 800 dpi block quarters 6 bits are required for referencing the corresponding combination. Since the 9 pixels of a quarter 1200 dpi block 41 can either be black or white (where black or white could also be transparent), there are 512 ($2^9$) possible combinations for these 9 pixels, so a said conversion table would require 512 entries for mapping the 512 1200 dpi, combinations to the 57 800 dpi combinations. FIG. 7 shows some examples of said mapping for different 1200 dpi input blocks. Alternatively, in some embodiments, BWT miscellaneous graphics are encoded losslessly at the original spatial resolution level at 29b. For a spatial resolution level of 1200 dpi, a lossless encoding of said graphical structures requires again 2 bits to define whether the 1200 dpi block contains black and white, black and transparent or white and transparent areas. Furthermore, for each of the 36 pixels of a 1200 dpi block, 1 bit is needed to indicate if a pixel is black or white, black or transparent, or white or transparent. Thus, 38 bits are required for a lossless encoding of BWT miscellaneous graphics at a spatial resolution level of 1200 dpi. Again, for selected patterns of losslessly encoded 1200 dpi blocks, a conversion table can be used.

Another type of graphical structures which are to be compressed to a lower spatial resolution, are a non-BWT edges, i.e. a block does not contain a BWT edge, but either any gray-scale pixels or all three of black, white and transparent areas. Non-BWT edges are detected at 23, after an edge has been found at 21, but this edge could not been determined as a BWT edge at 23. In some embodiments a block containing a non-BWT edge is converted at 24 to a lower spatial resolution using non-BWT edge compression. In some embodiments, wherein the image before compressing and encoding has been rendered to a spatial resolution of 1200 dpi, the block is converted at 24 to a spatial resolution of 800 dpi. In another embodiment, wherein the image before compressing and encoding also has been rendered to a spatial resolution of 1200 dpi, the block is converted at 24 to a spatial resolution of 600 dpi.

Figure 8:
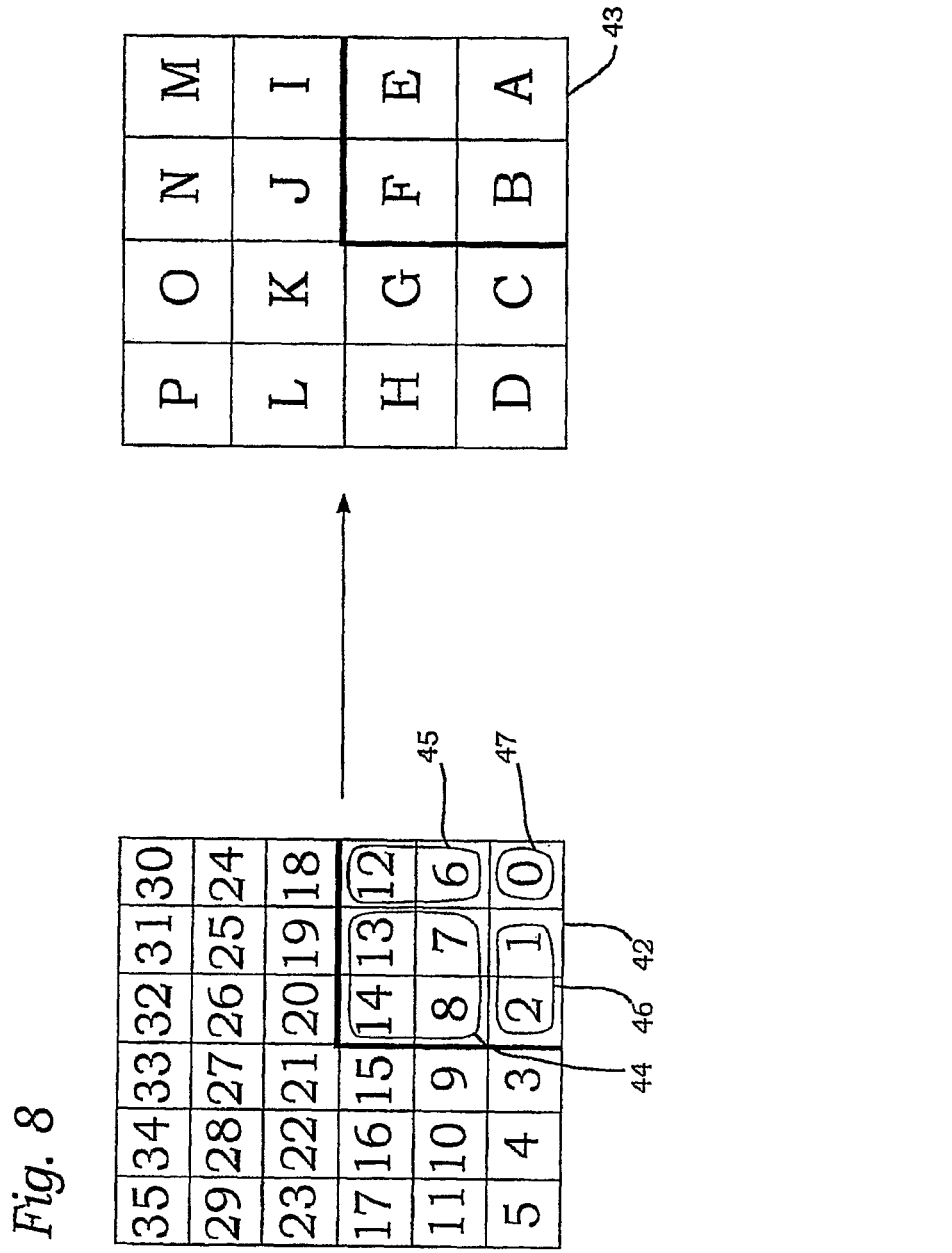
FIG. 8 schematically illustrates interpolation of a 1200 dpi block and mapping the interpolated values to an 800 dpi block.

This conversion is schematically depicted in FIG. 8. In some embodiments, each quarter 42 of a 1200 dpi block, thus 3×3 pixels, is mapped to a quarter 43 of an 800 dpi block, thus 2×2 pixels. In one embodiment, this may be accomplished by separating a 3×3 pixel area of a 1200 dpi block into 4 subareas. For example, in FIG. 8, sub-area 44 may cover pixels 14, 13, 8 and 7 and is mapped to pixel F in the 800 dpi block. Sub-area 45 may include pixels 12 and 6 and is mapped to pixel E, whereas sub-area 46 may include pixels 1 and 2 and could be mapped to pixel B. Finally, the last sub-area 47 only contains pixel 0, which is mapped to pixel A in the 800 dpi block. For the decision which color the 800 dpi pixels actually should contain after said mapping, several alternatives are conceivable. In some embodiments, an 800 dpi pixel could be made transparent, if any of the 1200 dpi pixels within a corresponding sub-area is transparent. If no 1200 dpi pixel within a sub-area is transparent, then a 800 dpi pixel could be black, if any of the 1200 dpi pixels within a corresponding sub-area is black. Alternatively, if no 1200 dpi pixel within a sub-area is either transparent or black, an 800 dpi pixel could be white, if any of the 1200 dpi pixels within a sub-area is white. In this way, high contrast components of the original 1200 dpi block would be preserved for the further image processing. If no transparent, black or white 1200 dpi pixel exists within a sub-area, in other words the sub-area contains a sheer gray-scale edge, in one embodiment an interpolation between the pixels is calculated. In another embodiment, the 800 dpi pixels may be calculated on the basis of the mean of all 1200 dpi gray-scale pixels within a corresponding sub-area.

The last type of graphical structures which are also to be compressed lossily to a lower spatial resolution, is built of blocks not containing an edge at all. Such blocks are determined at 21, if the respective block contains at least one intermediate gray level and the gray-level contrast within the block does not exceed a preselected threshold, i.e. no edge has been found. These blocks represent the type of graphical structures with the least color contrast and can therefore be discerned only with difficulty by a human observer. Thus, in some embodiments a single color value representing an entire block is calculated at 22. According to an embodiment, this single color value results from the mean of the color values of all pixels within the block.

Figure 9:
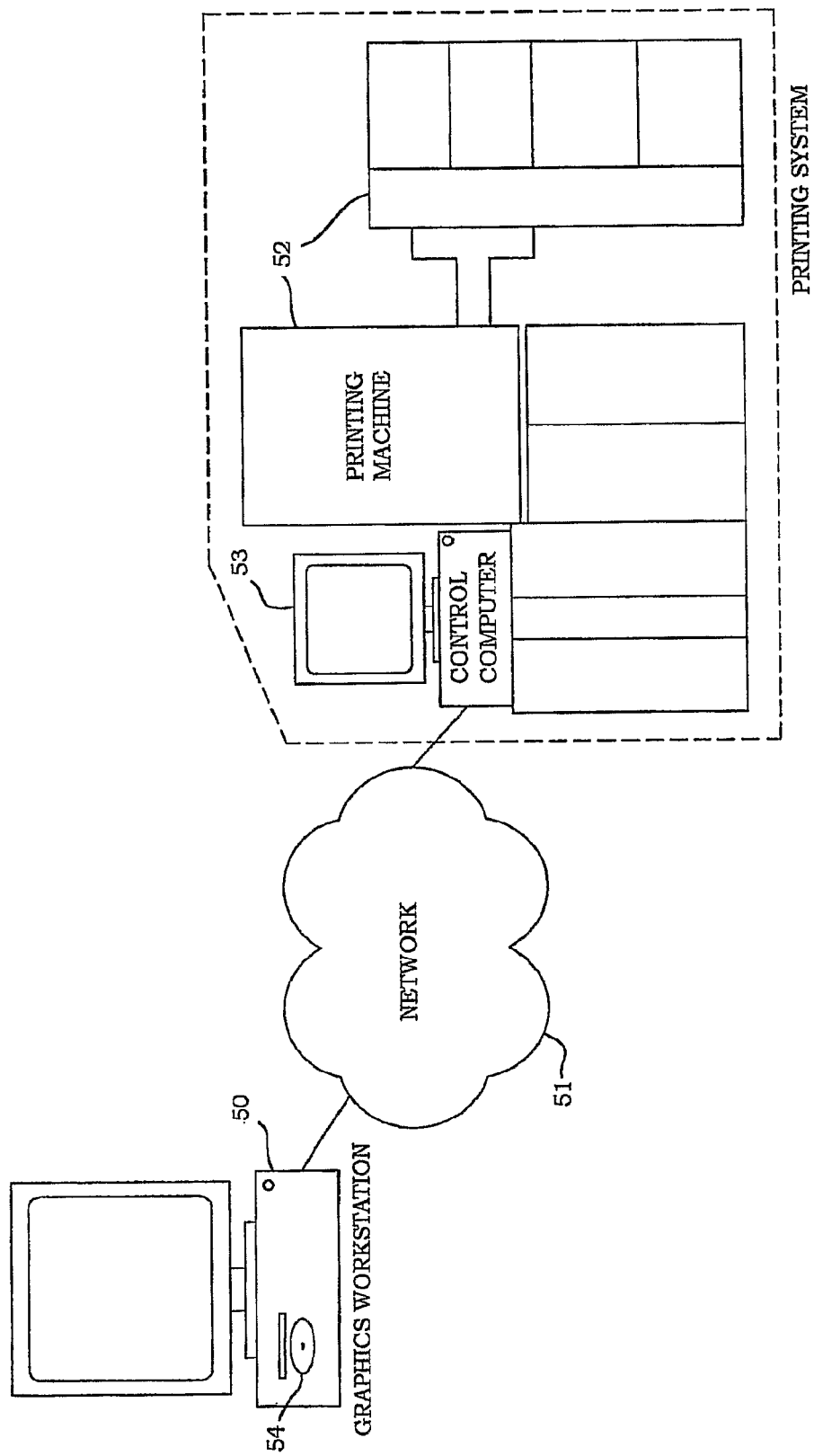
FIG. 9 shows a workstation, arranged to compress an image according to an embodiment, and a printing system, consisting of a control computer and a digital printing machine.

FIG. 9 shows a workstation 50, arranged to compress an image according to the embodiments, and a printing system, consisting of a control computer 53 and a digital printing machine 52. Both, workstation and printing system may be interconnected by a computer network 51. FIG. 9 also shows a machine-readable medium 54, on which the program code to perform an image compression according to the embodiments is stored and, for example, can be run on the graphics workstation 54.

The embodiments enable a lossless preservation of high contrast graphical features, which are especially distinguishable by the human eye, at a high spatial resolution in a highly compressed format, without increasing the amount of data required to define the image in comparison to a compression at a lower spatial resolution.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method for compressing a digital image to be printed, the image consisting of pixels, the method comprising:
   determining by a processor of a computing device, for blocks of pixels, whether a block contains a graphical structure that is to be maintained without loss because it is of a type that can be accurately perceived by a human observer, by:
      determining that the block includes just one of black and white pixels, black and transparent pixels, and white and transparent pixels, and that the block contains one or more of a horizontal line and a vertical line;
   encoding by the processor the block losslessly into a less voluminous format, if such a graphical structure has been found;
   compressing by the processor the block lossily, if no such graphical structure has been found.

2. The method of claim 1, wherein a block which contains no type of graphical structure that can be accurately perceived by a human observer is com-pressed lossily either at the same spatial resolution or to a lower spatial resolution.

3. The method of claim 1, wherein a block is composed of areas containing a maximum color level and a minimum color level, or the maximum color level and transparent areas, or the minimum color level and transparent areas, and a graphical structure within a block, which is to be maintained without loss, is at least one horizontal or at least one vertical straight line.

4. The method of claim 3, wherein a block is compressed at a level of 1200 dpi spatial resolution.

5. The method of claim 3, wherein a block is encoded with 9 bits at most.

6. The method of claim 3, wherein a block is compressed at a level of 1200 dpi spatial resolution.

7. The method of claim 1, wherein a graphical structure within a block, which is to be maintained without loss, is composed of one or two horizontal patterns of pixels and, optionally, horizontal straight lines, or one or two vertical patterns of pixels and, optionally, vertical straight lines, of a maximum and a minimum color level, or the maximum color level and transparent areas, or the minimum color level and transparent areas.

8. The method of claim 7, wherein a block is encoded with 27 bits at most.

9. The method of claim 1, wherein a block is composed of areas containing a maximum color level and a minimum color level, or the maximum color level and transparent areas, or the minimum color level and transparent areas, and a graphical structure within the block, which is to be maintained without loss, is neither composed of horizontal or vertical lines nor one or two different horizontal or one or two vertical patterns of pixels.

10. The method of claim 9, wherein the compressed block is encoded with 38 bits at most.

11. The method of claim 1, wherein a block is composed of areas containing a maximum color level and a minimum color level, or the maximum color level and transparent areas, or the minimum color level and transparent areas, and a graphical structure within the block, which is not to be maintained without loss, is neither composed of horizontal or vertical lines nor of one or two different horizontal or one or two vertical patterns of pixels.

12. The method of claim 11, wherein a block is converted from a spatial resolution of 1200 dpi to a spatial resolution of 800 dpi.

13. The method of claim 12, wherein the converted block is encoded with 26 bits at most.

14. The method of claim 11, wherein a conversion is conducted by using a predefined conversion table.

15. The method of claim 11, wherein the converted block may contain at least one additional gray scale.

16. The method of claim 1, wherein the block, which contains at least one intermediate color level and the color level contrast within the block, exceeds a pre-selected threshold, or which is composed of the maximum color level, the minimum color level and transparent areas, is compressed lossily.

17. The method of claim 16, wherein the block is converted from a spatial resolution of 1200 dpi to a spatial resolution of 800 dpi.

18. The method of claim 16, wherein the conversion is conducted by interpolating pixels of sub-areas within a high spatial resolution block and mapping the interpolated pixels to one designated low spatial resolution pixel.

19. The method of claim 1, wherein the block, which contains at least one intermediate color level and the color level contrast within the block, does not exceed a preselected threshold, is compressed lossily to a lower spatial resolution.

20. The method of claim 1, wherein determining whether the block contains a graphical structure that is to be maintained without loss is performed by one or more of:
   determining that the block includes just one of black and white pixels, black and transparent pixels, and white and transparent pixels, and that the block contains one or more of a horizontal line and a vertical line;
   determining that the block includes just one of black and white pixels, black and transparent pixels, and white and transparent pixels, and that the block contains a line that has a slope below a threshold.

21. A computer, programmed to compress an image to be printed by a compression method comprising:
   determining by a processor of the computer, for blocks of pixels, whether a block contains a graphical structure that is to be maintained without loss because it is of a type that can be accurately perceived by a human observer, by:
      determining that the block includes just one of black and white pixels, black and transparent pixels, and white and transparent pixels, and that the block contains one or more of a horizontal line and a vertical line;
   encoding by the processor the block losslessly into a less voluminous format, if such a graphical structure has been found;
   compressing by the processor the block lossily, if no such graphical structure has been found.

22. A printing system arranged to print an image, which the printing systems receives in a compressed representation, the printing system comprising a processor programmed to decode the compressed representation, the compressed representation having the following characteristics:
   blocks, each having a multiplicity of pixels, containing a graphical structure of a type that can be accurately perceived by a human observer are encoded losslessly in a less voluminous format than that of a bitmap representation of the pixels of the block, the blocks comprising:
      a block including just one of black and white pixels, black and transparent pixels, and white and transparent pixels, and containing one or more of a horizontal line and a vertical line;
   blocks not containing such graphical structures have been compressed lossily.

23. A computer program product which is in the form of a non-transitory machine-readable medium with program code stored on it,
   wherein the program code is arranged to carry out a method for compressing an image to be printed, the method comprising:
   determining, for blocks of pixels, whether a block contains a graphical structure that is to be maintained without loss because it is of a type that can be accurately perceived by a human observer, by:
      determining that the block includes just one of black and white pixels, black and transparent pixels, and white and transparent pixels, and that the block contains one or more of a horizontal line and a vertical line;
   encoding the block losslessly into a less voluminous format, if such a graphical structure has been found;
   compressing the block lossily, if no such graphical structure has been found.

\* \* \* \* \*